US005691810A

United States Patent [19]

Bilodeau et al.

[11] Patent Number: 5,691,810

[45] Date of Patent: Nov. 25, 1997

[54] DUAL-BED SCANNER WITH REDUCED TRANSPORT TIME

[75] Inventors: Steven J. Bilodeau, Setauket; William E. Yonescu, Smithtown, both of N.Y.

[73] Assignee: Robotic Vision Systems, Inc., Hauppauge, N.Y.

[21] Appl. No.: 435,821

[22] Filed: May 5, 1995

[51] Int. Cl.$^6$ .............................. G01N 21/00; B07C 5/00

[52] U.S. Cl. .............................................. 356/237; 209/587

[58] Field of Search .............................. 356/237; 348/94, 348/95, 86, 87, 125–134; 73/865.8; 193/346.2, 488.8; 209/587, 522, 576, 577

[56] References Cited

U.S. PATENT DOCUMENTS 5,484,062 1/1996 Rich ....................................... 209/587

OTHER PUBLICATIONS

"Flexible Scanning" in Inspection Supplement, p. S–14, Sep.1995.

*Primary Examiner*—Frank G. Font
*Assistant Examiner*—Amanda Merlino
*Attorney, Agent, or Firm*—Morrison Law Firm

[57] ABSTRACT

A scanning system inspects elements, such as ICs, continuously by positioning a second tray containing elements to be inspected adjacent a scan bed in which the elements in a first tray are being scanned. Immediately upon completion of scanning of elements in the first tray, scanning begins on elements in the second tray. During scanning of the second tray, the first tray is off loaded, and a third tray replaces the first tray. The cycle is repeated continuously. Since transport and scanning operations take place simultaneously, transport delay is reduced substantially, as compared to the serial system of the prior art. When the transport, positioning, and off loading operations consume substantially less time than the scanning operation, a fresh tray of elements always awaits scanning upon completion of scanning of elements in a tray. In one embodiment, first and second scan beds are elevated above a conveyor, thereby permitting incoming and outgoing trays to pass on the conveyor below the scan beds without interference with the trays elevated in the scan beds. A replace operation, either on-line or off-line, replaces defective elements detected in the scanned trays with known-good elements, whereby the output of the apparatus is 100 percent known-good elements. An embodiment in which transport and positioning takes longer than the scanning operation, thereby requiring a delay in scanning, is disclosed. This latter embodiment, although it does not provide continuous scanning, nevertheless reduces cycle time by virtue of parallel operation of scanning and transport functions.

10 Claims, 1 Drawing Sheet

LOAD
TRANS
SCAN BED
TRANS
REPLACE
OFF LOAD

LOAD
TRANS
SCAN BED 1
SCAN BED 2
TRANS
REPLACE
OFF LOAD

DUAL-BED SCANNER WITH REDUCED TRANSPORT TIME

The present invention relates to scanners and, more particularly, to optical non-contact scanning devices for determining the physical condition of a workpiece.

Optical scanning devices have found use in scanning integrated circuits for final physical inspection to determine that all leads are in place, and that all leads are disposed in locations according to specifications. Other applications include scanning for correct location and thickness of solder pads, and other elements appearing in predictable locations. Applications outside the solid state manufacturing field are also contemplated.

In a modern scanning device for scanning integrated circuits (ICs), a 3-dimensional optical scanning device is displaced in a pattern over a tray of ICs. The tray includes a plurality of pockets in a row and column array into which the ICs are placed. The scanning pattern follows an entire row or column, optionally bridging adjacent ICs, to inspect all of the leads therein, and then moves to another row or column until all leads are inspected. A memory device stores row and column data on ICs. After scanning, the memory device is accessed to identify ICs which fail to meet inspection criteria, and which then may be removed, and replaced with known-good ICs so that the tray which leaves the scanning device contains 100 percent known-good ICs which have been 100 percent inspected. This type of scanning is called "in-tray" scanning. The benefit of in-tray scanning is that the good circuits in the tray are not touched or disturbed after inspection, thus avoiding physical damage to the leads.

Typical three-dimensional scanning techniques are disclosed in U.S. Pat. Nos. 4,594,001 and 4,991,968.

In the early days of in-tray scanning, each tray was placed manually in the bed of the scanner and removed manually after inspection. This required a full-time operator for each scanner. The benefits of speed and accuracy more than made up for the cost of dedicating an operator to each machine.

The present state of the art employs an automatic feeder which employs a conveyor belt to move trays of ICs, one tray at a time, from an input stack to a scanning bed. At the scanning bed, the tray is stopped, positioned, and the scanning is performed. After scanning, the tray is moved to a reject station while a new tray is transported from the input stack to the scanning bed. The operation of stopping, tilting, vibration, and scanning is repeated on the new tray. At the reject station bad ICs detected by the system are removed automatically, and replaced with known-good ICs. The tray of good ICs is then moved from the reject station to an output stack where the latest tray is stacked below previously handled trays.

Throughput (units per hour) is critical to the high-volume manufacture of ICs. The cycle time, $T_C$, of the above-described automated scanning system is as follows:

$$T_C=T_T+T_S$$

where:

$T_C$=cycle time $T_T$=transport time from input stack to scanning bed (includes positioning time)

$T_S$=scanning time

By definition, throughput time is the inverse of cycle time, i.e. Throughput time=$1/T_C$.

Typical scanning times are from about 30 to about 90 seconds, while typical transport times are from about 20 to about 30 seconds. Thus, a substantial part of the cycle time is consumed by the transport time.

Prior-art attempts to increase throughput have focussed on increasing the transport speed, thereby reducing the transport time. However, this approach can be carried only so far. Even with the fastest transport, some time must be devoted to transport, which inevitably reduces the throughput of the system.

OBJECTS AND SUMMARY OF THE INVENTION

Accordingly, it is an object of the invention to provide a scanning system and method which overcome the drawbacks of the prior art.

It is a further object of the invention to provide a scanning system and method wherein zero delay is occasioned by transport time. Scanning continues without any delay between successive trays of parts.

It is a still further object of the invention to provide a scanning system and method in which each tray is moved from the transport path for scanning to continue while a new tray or a previously scanned tray is transported past the tray being scanned.

Briefly stated, the present invention provides a scanning system in which elements, such as ICs, are inspected continuously by positioning a second tray containing elements to be inspected adjacent a scan bed in which the elements in a first tray are being scanned. Immediately upon completion of scanning of elements in the first tray, scanning begins on elements in the second tray. During scanning of the second tray, the first tray is off loaded, and a third tray replaces the first tray. The cycle is repeated continuously. Since transport and scanning operations take place simultaneously, transport delay is reduced substantially, as compared to the serial system of the prior art. When the off loading and positioning operations consume substantially less time than the scanning operation, a fresh tray of elements always awaits scanning upon completion of scanning of elements in a tray. In one embodiment, first and second scan beds are elevated above a conveyor, thereby permitting incoming and outgoing trays to pass on the conveyor below the scan beds without interference with the trays elevated in the scan beds. A replace operation, either on-line or off-line, replaces defective elements detected in the scanned trays with known-good elements, whereby the output of the apparatus is 100 percent known-good elements. An embodiment in which transport and positioning takes longer than the scanning operation, thereby requiring a delay in scanning, is disclosed. This latter embodiment, although it does not provide continuous scanning, nevertheless reduces cycle time by virtue of parallel operation of scanning and transport functions.

According to an embodiment of the invention, there is provided apparatus for scanning elements in a pocketed tray, comprising: an optical sensor, said optical sensor being of a type movable in a pattern for scanning said elements, first means for moving a first pocketed tray into an operable position with said optical sensor, and second means for moving a second pocketed tray toward a position adjacent said first pocketed tray while said optical sensor is performing said pattern over said first pocketed tray, whereby said optical sensor is enabled to beginning scanning said second pocketed tray with reduced transport delay.

According to a feature of the invention, there is provided a method for scanning elements in a pocketed tray with an optical sensor, comprising: moving a first pocketed tray containing said elements into an operable position with said optical sensor, moving said optical sensor in a pattern for scanning said elements, moving a second pocketed tray containing said elements toward a position adjacent said first pocketed tray while said optical sensor is performing said pattern over said first pocketed tray, scanning elements in said pattern over said second pocketed tray upon completion of said pattern over said first pocketed tray, whereby said optical sensor is enabled to continue scanning without reduced transport delay.

According to a further feature of the invention, there is provided apparatus for scanning elements in pocketed trays, comprising: first means for positioning a first pocketed tray in a first scan bed, means for scanning said elements in said first pocketed tray, second means for positioning a second pocketed tray in a second scan bed adjacent said first scan bed while said scanning is being performed, means for beginning scanning of elements in said second pocketed tray in said second scan bed upon completion of said scanning said elements in said first pocketed tray, whereby transport delay between scanning said elements in said first and second pocketed trays is reduced, means for transporting a scan-completed pocketed tray to an off-load position, and said first and second means for positioning including means for avoiding interference between a pocketed tray in transit to its scan bed and a pocketed tray in its scan bed, and between a pocketed tray on its way to said off-load position and a pocketed tray in its scan bed.

According to a further feature of the invention, there is provided a method for scanning elements in pocketed trays, comprising: positioning a first pocketed tray in a first scan bed, scanning said elements in said first pocketed tray, positioning a second pocketed tray in a second scan bed adjacent said first scan bed while said scanning is being performed, beginning scanning of elements in said second pocketed tray in said second scan bed upon completion of said scanning said elements in said first pocketed tray, whereby transport delay between scanning said elements in said first and second pocketed trays is reduced, transporting a scan-completed pocketed tray to an off-load position, and avoiding interference between a pocketed tray in transit to its scan bed and a pocketed tray in its scan bed, and between a pocketed tray on its way to said off-load position and a pocketed tray in its scan bed.

According to a still further feature of the invention, there is provided apparatus for continuous scanning of elements in pocketed trays, comprising: means for positioning a first pocketed tray in a first scan bed, means for scanning elements in said first pocketed tray, means for positioning a second pocketed tray in a second scan bed, while scanning is being performed on said first pocketed tray, means for immediately beginning scanning elements in said second pocketed tray after completion of scanning elements in said first pocketed tray, means for transporting said first pocketed tray to an off-load position while scanning of said second pocketed tray is being performed, means for positioning a third pocketed tray in said first scan bed before completion of scanning of elements in said second pocketed tray, whereby scanning of said elements in said third pocketed tray is enabled to begin immediately upon completion of scanning of elements in said second pocketed tray, and means for transporting said second pocketed tray to said off-load position while scanning of said third pocketed tray is being performed, whereby continuous scanning without transport delay is enabled.

According to yet another feature of the invention, there is provided a method for continuous scanning of elements in pocketed trays, comprising: positioning a first pocketed tray in a first scan bed, scanning elements in said first pocketed tray, positioning a second pocketed tray in a second scan bed, while scanning is being performed on said first pocketed tray, beginning scanning elements in said second pocketed tray after completion of scanning elements in said first pocketed tray, transporting said first pocketed tray to an off-load position while scanning of said second pocketed tray is being performed, positioning a third pocketed tray in said first scan bed before completion of scanning of elements in said second pocketed tray, whereby scanning of said elements in said third pocketed tray is enabled to begin upon completion of scanning of elements in said second pocketed tray, and transporting said second pocketed tray to said off-load position while scanning of said third pocketed tray is being performed, whereby scanning with reduced transport delay is enabled.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figures 1, 2:
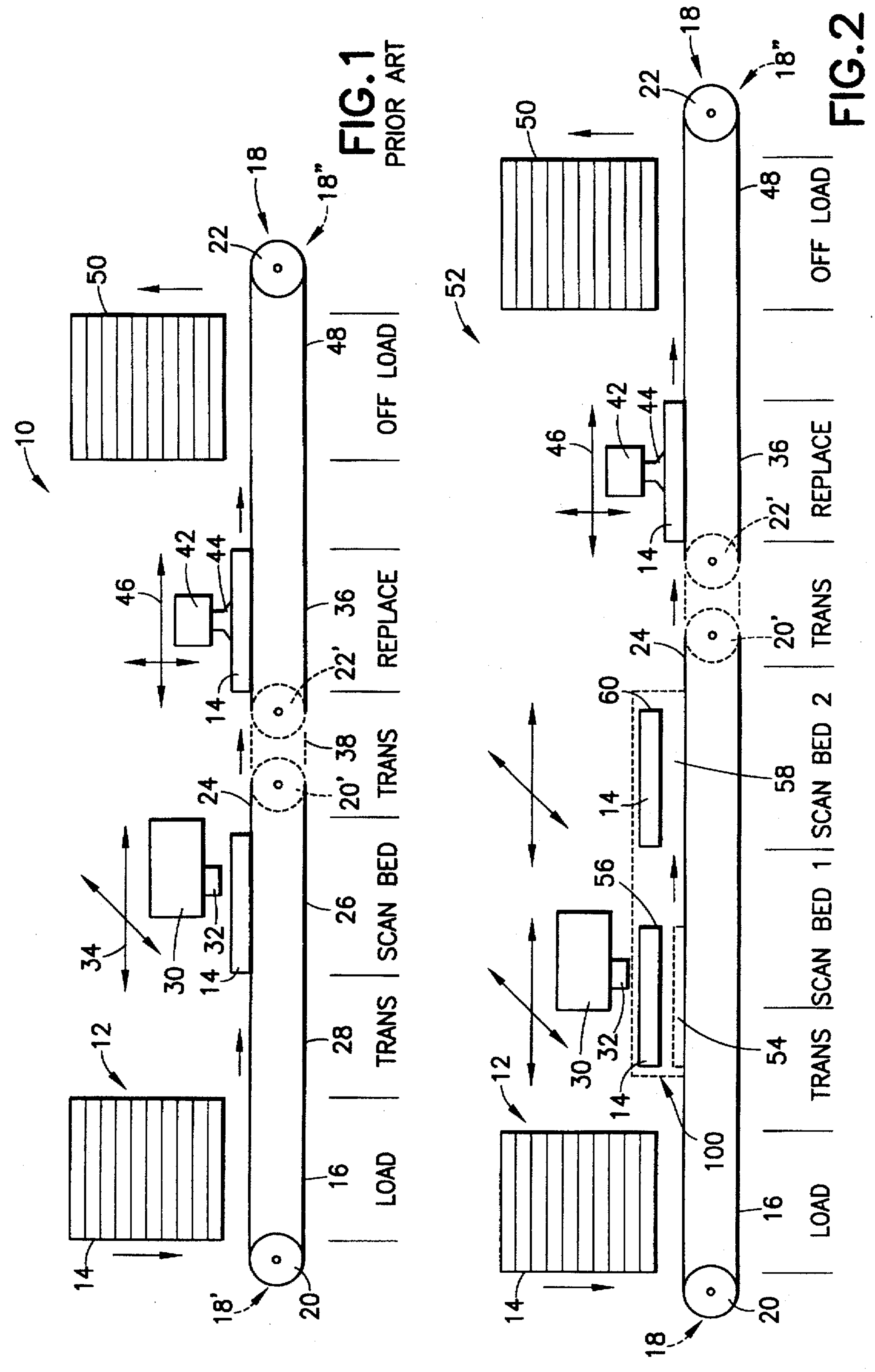
FIG.1 PRIOR ART
FIG. 1 is a schematic side view of a scanning system according to the prior art.
FIG. 2 is a schematic side view of a scanning system according to an embodiment of the present invention.

Referring to FIG. 1, a scanning system of the prior art, shown generally at 10, includes an input stack 12 containing one or more pocketed trays 14 disposed above a loading station 16. A conveyor 18 includes a driven roller 20 and an idler roller 22 spaced apart at opposite ends of scanning system 10. A conveyor belt 24 is reeved over rollers 20 and 22.

Although any convenient arrangement is possible, conveyor belt 24 is preferably two parallel belt tapes (not shown separately) supported by a horizontal surface (not shown) below the upper run of conveyor belt 24.

A scan bed 26 is disposed on conveyor belt 24 downstream of input stack 12. A transport distance 28 separates input stack 12 from scan bed 26. A scanning head 30 is disposed over scan bed 26. Scanning head 30 includes an optical sensor 32 capable of detecting characteristics of objects in pocketed tray 14. Scanning head 30 is moved in a pattern, indicated by arrows 34 to align optical sensor 32 over desired portions of pocketed tray 14. The pattern may be of any convenient shape such as, for example, the shape disclosed in U.S. Pat. No. 5,371,375, the disclosure of which is herein incorporated by reference. Scanning may use two dimensional or three dimensional optical non contact measuring methods.

During scanning, the good/bad condition of each scanned element, and its location within pocketed tray 14, are stored in a memory device (not shown) which might be, for example, a computer memory. In addition to a simple binary good/bad stored test result, details of the condition of each scanned element such as, leads too high/too low, lead heights not uniform, leads askew, as well as the locations of such anomalies (over entire IC, over all ICs, one end of IC, progressive defect along IC) may be stored. In some applications, besides the condition of each IC, statistics on the run of ICs being scanned are developed and stored for use in statistical quality control, and in machine adjustment.

A replace station 36 is disposed a second transport distance 38 downstream of scan bed 26. A pick-and-place robot 42 is disposed over replace station 40. Robot 42 is moveable over a pocketed tray 14 to vertical alignment with any position which may contain an inspected element, into and out of the page, and parallel to the page as indicated by a horizontal arrow 46. In some applications, the motion in the direction may be accomplished by splitting conveyor 18 into two independent, but coordinated, unidirectional conveyors, an input conveyor 18' and an output conveyor 18". For this purpose, an idler roller 20' and a driven roller 22', shown in dashed line, are disposed at an appropriate location along the run. The speeds and directions of conveyors 18' and 18" must be synchronized when a pocketed tray 14 is transferred from one to the other.

Robot 42 includes a vacuum gripper 44. Vacuum gripper 44 is moveable downward into contact with an upper surface of an inspected element over which it is aligned. Vacuum gripper 44 includes a suction device operable to attach itself to a selected element, such as an IC, in pocketed tray 14 with which it is in contact.

Once vacuum gripper 44 is in contact with the selected element, it may lift the selected element free of pocketed tray 14 for any purpose. In one embodiment of the invention, vacuum gripper 44 is guided to locations identified by the control system as containing defective elements, and then removes defective elements from pocketed tray 14, and discards them. In a more preferred embodiment of the invention, after discarding defective elements, robot 42 replaces the discarded elements with known-good elements so that, at the end of operation of robot 42, all defective elements have been removed and replaced with known-good element, whereby the output of scanning system 10 is filled pocketed trays 14, in which all pockets are filled with known-good elements.

The locations of the source of the known-good elements relative to pocketed tray 14 in replace station 36 and the destination of the replaced parts are immaterial to the present invention. However, for completeness of disclosure, in one embodiment of the invention, a tray of known-good elements (not shown) is located laterally adjacent pocketed tray 14 in a first direction. An initially empty pocketed reject tray (also not shown) for rejects is located laterally adjacent pocketed tray 14 in the opposite direction.

In operation, robot 42 first picks up a defective element from pocketed tray 14, transports the defective element over an empty pocket in the reject tray, and deposits the defective element in the pocket. Then it moves over a filled pocket in the known-good tray, picks up a known-good element, transports it over the pocket in pocketed tray 14 from which the defective element has been removed, and places the known-good element in the pocket. Robot 42 (working over output conveyor 18" in the split-conveyor embodiment) continues this operation until all defective elements are removed from pocketed tray 14, and are replaced by good elements. During this operation, scanning system 10 continuously updates its memory on which defective elements in pocketed tray 14 have been replaced, which pockets in the known-good tray still contain known-good elements, and which pockets in the reject tray are empty for reception of a defective element. This data is used in the intelligent guidance of robot 42.

In some operations, careful handling of defective elements is not required. In such an operation, instead of placing defective elements in pockets of a reject tray, robot 42 merely carries defective elements to a discard location which may be, for example, a chute leading to a reject container.

Following operations at replace station 36, the culled and refilled pocketed tray 14 is transported to an off-load station 48. Pocketed tray 14 is added to the bottom of an output stack 50, in preparation for the arrival of the next pocketed tray 14.

As noted in the description of the background of the invention, the cycle time of this prior art scanning system has two components:

$$T=T_T+T_S$$

where:

T=cycle time (throughput time)

$T_T$=transport time from input stack to scanning bed $T_S$=scanning time

The time required for an input pocketed tray 14 to be moved into position at scan bed 26 following completion of scanning of elements in the previous pocketed tray 14 is the transport time $T_T$. It is not uncommon in the prior art to find that $T_T \geqq T_S$. Thus, the total conventional cycle time may be more than twice the cycle time for scanning alone. Since scanning system 10 cannot totally eliminate transport time $T_T$, scanning head 30 must wait for the arrival and positioning between scanning of pocketed trays 14. This delay reduces throughput.

In the foregoing description, it is considered that the depositing of a pocketed tray 14 from the bottom of input stack 12 onto conveyor 18 is conventional, and need not be described. References to conveyor 18 above are equally applicable to conveyors 18' and 18". In addition, it is considered that conveyor 18 (or conveyors 18' and 18"), scanning head 30, robot 42 and the feeding of an output pocketed tray 14 to output stack 50 are all conventional operations for which detailed descriptions may be omitted without depriving one skilled in the art of full knowledge of how to make and use the invention.

Besides using data derived from scanning head 30 to control the culling or replacement of defective elements, it is within the contemplation of the inventor that the data collected by optical sensor 32 may be fed back to the manufacturing operation producing elements in pocketed trays 14 for controlling adjustment of machinery in the manufacturing operation. Such information may be used, for example, to adjust the machinery to correct for improper heights of pins or solder pads on ICs, missing pins or pads, or any other operating parameter which can be determined from a physical inspection of the exterior of the elements being produced. As noted above, the data may be raw data describing specific defects, or may be statistical data for use in statistical quality control of the process of fabricating the elements being inspected.

Referring now to FIG. 2, a scanning system according to the present invention, shown generally at 52, includes a conveyor 18 reeved between a driven roller 20 and an idler roller 22, or conveyors 18' and 18", as in the prior art embodiment of FIG. 1. As in the prior embodiment, pocketed trays 14, containing elements to be inspected, are fed one at a time from an input stack 12 onto conveyor 18. A pocketed tray 14 is transported to a first position 54 on conveyor 18, shown as a dashed outline. A tray positioning device 100 elevates pocketed tray 14 from first position 54 to a first elevated scan bed 56. All of the operations described above for the prior-art single-bed scanning system 10 of FIG. 1 are performed at first elevated scan bed 56. However, since the pocketed tray in first elevated scan bed 56 is raised clear of conveyor 18, clearance exists for a second pocketed tray 14 to be carried along conveyor 18 below first elevated scan bed 56 to a second position 58 downstream of first position 54 as soon as the first pocketed tray 14 is raised sufficiently clear of conveyor 18. Tray positioning device 100 elevates second pocketed tray 14 above conveyor 18 to a second elevated scan bed 60, immediately adjacent first elevated scan bed 56. Transport of the second pocketed tray 14 to second position 58, raising it to second elevated scan bed 60, and any other pre-scanning steps, are completed before scanning of elements in pocketed tray 14 in first elevated scan bed 56 is completed.

Immediately after completion of scanning of elements in first pocketed tray 14 in first elevated scan bed 56, scanning head 30 moves directly to begin scanning of elements in pocketed tray 14 in second elevated scan bed 60. The delay time between completion of scanning and the beginning of scanning is so short that it can be ignored. Thus, the transport time for moving and preparing the second pocketed tray 14 for scanning is effectively zero.

While scanning head 30 performs its scan pattern over pocketed tray 14 in second elevated scan bed 60, pocketed tray 14 in first elevated scan bed 56 is lowered onto conveyor 18 and moved below second elevated scan bed 60 to replace station 36. A new pocketed tray 14 from input stack 12 is moved by conveyor 18 to first position 54, raised to first elevated scan bed 56 and prepared for scanning. As before, immediately that scanning of pocketed tray 14 in second elevated scan bed 60 is completed, scanning head 30 begins scanning elements in pocketed tray 14 in first elevated scan bed 56 while pocketed tray 14 in second elevated scan bed 60 is lowered onto conveyor 18 and carried to replace station 36.

During scanning at either elevated scan bed 56 or 60, robot 42 completes its culling of defective elements so that, when the next pocketed tray 14 is carried to it, replace station 36 is empty, and ready to receive it.

It will be clear to one skilled in the art that the timing of transport along conveyor 18 may be varied without departing from the spirit and scope of the invention. For example, a new pocketed tray 14 from input stack 12 may be transported toward the first position 54 or the second position 68 at the same time that a previously scanned pocketed tray 14 is transported toward replace station 36. In addition, transport from replace station 36 to off-load station 48 may also occur at the same time. Alternatively, transport times may be programmed at different times, provided that a pocketed tray 14, ready for scanning is in place when scanning of a previously positioned pocketed tray 14 is completed, and a culled pocketed tray 14 is cleared from replace station 36 before an incoming pocketed tray 14 must be accepted.

It will be further clear to one skilled in the art that culling of pocketed trays 14 at replace station 36 may be done off-line rather than on-line as shown. This may be required if the scanning speed is increased beyond the ability of robot 42 to complete the culling operation before the next pocketed tray 14 must be accommodated. In this case, scanned pocketed trays 14 are transported directly to output stack 50. The culling or replacement operation may then be performed using data collected by scanning system 52, but at a later time. This technique may employ a unique identifier of each pocketed tray 14. The stored data is then related to the uniquely identified pocketed tray 14 during replacement. The unique identifier may be, for example, a bar code on each pocketed tray 14, which is readable by an optical scanning system during the residence time of each pocketed tray 14 in scanning system 52, and which is also readable by an off-line replace station. Alternatively, each pocketed tray 14, and the data related to it, may be identified simply by its position in output stack 50.

It will be clear to one skilled in the art that an embodiment of the invention may reduce transport time $T_T$ significantly, but not reduce it to zero. Such a result is fully within the contemplation of the present invention. If, for example, improvements in scanning time permit completion of scanning before completion of transport, parallel operation of transport of a second tray while scanning a first tray permits the beginning of scanning on the second tray much sooner than permitted by the prior art, even though delay for transport is not reduced fully to zero.

The prior description is based on clearing conveyor 18 or 18' by raising pocketed trays 14 to permit transport of pocketed trays 14 to pass thereunder so that a fully prepared pocketed tray 14 is available immediately at the end of scanning. Raising or elevating pocketed trays to clear conveyor 18 is only one of the ways in which blocking of conveyor 18 can be avoided. In the broader sense, any positioning scheme which permits positioning and preparing a second pocketed tray 14 while scanning is performed on a previously prepared pocketed tray 14 should be considered part of the present invention. For example, instead of raising pocketed trays 14 into elevated scan beds 56 and 60, pocketed trays 14 may be moved laterally into scan beds off conveyor 18 for preparation and scanning, and then moved back onto conveyor 18 on completion of scanning.

In a further embodiment of the invention, instead of raising pocketed trays 14 into elevated locations, pocketed trays 14 are lowered into scan beds below the level of conveyor 18.

It is not necessary for the practice of the invention for one pocketed tray 14 to pass under, over or past another pocketed tray. A moving-bed embodiment envisions scanning a pocketed tray 14 as the scanning bed moves in the downstream direction to permit a second pocketed tray 14 to be moved into position and prepared for scanning immediately upstream of it. When scanning of the leading pocketed tray 14 is completed, the next pocketed tray 14 is in position ready to be scanned. That is, in terms of locations defined in FIG. 2, scanning begins on a pocketed tray 14 in first position 54. As scanning progresses, the pocketed tray 14 being scanned is advanced toward second position 58 while the next pocketed tray 14 is moved toward first position 54. Upon completion of scanning, the next pocketed tray 14 is ready in first position 54 and, while it is scanned and advanced, the completed pocketed tray 14 is transported from second position 58 toward replace station 36.

A further embodiment moves each pocketed tray 14 laterally to permit a second pocketed tray to take up its position on conveyor 18. In this embodiment, scanning begins in a moving scan bed as the pocketed tray 14 is being moved laterally.

In a still further embodiment of the invention, scanning of a pocketed tray 14 takes place in a scan bed which moves upward during scanning while a second pocketed tray 14 is moved into vertical alignment below it. Upon completion of scanning of the upper pocketed tray 14, the scanning head 30 is lowered immediately to begin scanning the lower pocketed tray 14, while the completed upper pocketed tray 14 is moved away and the lower pocketed tray begins moving upward.

In a still further embodiment of the invention, two stationary, vertically aligned, scanning beds are positioned over conveyor 18. In this embodiment, while one of the scanning beds is active, a pocketed tray 14 is raised or lowered to the level of the second scanning bed, and then advanced into the scanning bed. As before, as soon as scanning is completed, scanning immediately resumes in the scanning bed above or below the previously active scanning bed.

A further embodiment of the invention employs two conveyors 18 (or 18') operating side by side. Each conveyor moves its pocketed trays to a scan bed which is closely adjacent a scan bed on the other conveyor. Thus, while scanning of a pocketed tray 14 proceeds on one of the scan beds, a pocketed tray 14 is advanced into position on the adjacent scan bed. Upon completion of scanning a pocketed tray 14, scanning head 30 immediately moves to scan the adjacent pre-positioned pocketed tray 14. During this scanning operation, the just-scanned pocketed tray 14 is moved off on its conveyor 18, and a new pocketed tray 14 is moved into position, and prepared for scanning. In this manner, continuous scanning is enabled. In this embodiment, either one or two input stacks 12 may be employed, and either one or two output stacks 50 may receive completed pocketed trays 14.

Besides completed ICs, and other objects, the present invention may be employed to inspect in-process parts such as, for example, conventional lead frames with ICs attached. That is, a strip of lead frames may be inspected for defects in the lead frame itself, in the ICs affixed thereto, or in the interface between ICs and lead frames. In this case, removal of ICs which fail to satisfy inspection criteria may be performed by a downstream punch, or other technique, guided by the collected inspection data.

The exact apparatus for performing the transport, scanning and replacing in all of the above alternative embodiments are conventional and it is therefore considered that a detailed description thereof would be mere prolixity. Therefore, such detailed description is omitted.

The optical functions being performed in scanning may be three-dimensional scanning, two-dimensional scanning or strobed two-dimensional scanning. Three dimensional scanning may be performed by any convenient optical triangulation, confocal microscopy, laser microscopy, stereo cameras or any other optical ranging method currently existing, or to be discovered.

It will be recognized that the term "pocketed tray" is used for convenience of description. The function of the pocketed tray is to position elements to be scanned in known orientations with respect to each other and with respect to the remainder of the scanning apparatus. Thus, other configurations besides trays with pockets must be read into the term pocketed tray. For example, instead of a tray with pockets, a tray or plate with bosses may be employed to provide the required alignment. In one embodiment, ICs having pins aligned in a single direction, are positioned by pushing the pins through an easily penetrable material such as plastic foam. One skilled in the art will recognize that such plastic foam material is preferably a conventional conductive plastic foam in order to protect the ICs from damage due to static electricity. The term pocketed tray must be read to encompass these possible embodiments, as well as others now in existence or to be later invented. It is equally within the contemplation of the invention that certain ICs, especially ones that are large and complicated, may be fed to the scanning system directly, without being disposed in a tray.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for scanning elements in a plurality of pocketed trays, comprising:

an optical sensor;

said optical sensor being of a type movable in a pattern for scanning said elements;

first means for moving a first pocketed tray of said plurality of pocketed trays into an operable position with said optical sensor; and second means for moving a second pocketed tray of said plurality of pocketed trays toward a position adjacent said first pocketed tray while said optical sensor is performing said pattern over said first pocketed tray, such that said optical sensor begins scanning said second pocketed tray at said position adjacent with reduced transport delay.

2. Apparatus according to claim 1, wherein said position adjacent includes a horizontally adjacent position.

3. Apparatus according to claim 1, wherein said position adjacent includes a vertically adjacent position.

4. Apparatus according to claim 1, wherein:

said first and second means for moving includes a conveyor;

said operable position being a first scan bed; and said position adjacent being a second scan bed horizontally adjacent said first scan bed.

5. Apparatus according to claim 4, further comprising: means for permitting either one of said first and second pocketed trays on said conveyor to pass the other thereof in its scan bed, whereby a pocketed tray on said conveyor is enabled to reach its scan bed, and a scan-completed pocketed tray on said conveyor is permitted to pass along said conveyor to be off loaded without interference therebetween.

6. Apparatus according to claim 1, wherein said transport delay is zero.

7. Apparatus for scanning elements in pocketed trays, comprising:

first means for positioning a first pocketed tray of said pocketed trays in a first scan bed;

means for scanning said elements in said first pocketed tray;

second means for positioning a second pocketed tray of said pocketed trays in a second scan bed adjacent said first scan bed while said scanning is being performed;

means for beginning scanning of elements in said second pocketed tray in said second scan bed upon completion of said scanning said elements in said first pocketed tray, such that transport delay between scanning said elements in said first and second pocketed trays is reduced;

means for transporting a scan-completed pocketed tray to an off-load position; and said first and second means for positioning including means for avoiding interference between a pocketed tray in transit to its scan bed and a pocketed tray in its scan bed, and between a pocketed tray on its way to said off-load position and a pocketed tray in its scan bed.

8. Apparatus according to claim 7, further comprising:

replace means, upstream of said off-load position; and said replace means including means removing all detected defective elements in said pocketed tray, and replacing all removed elements with known-good elements, whereby an output of said apparatus includes 100 percent good elements.

9. Apparatus according to claim 8, wherein a cycle time of said replace means is no more than a cycle time for scanning a pocketed tray, whereby said scanning and replace means operation can be performed as a continuous operation, without delay of either operation waiting for the other.

10. Apparatus for continuous scanning of elements in pocketed trays, comprising:

means for positioning a first pocketed tray of said pocketed trays in a first scan bed;

means for scanning elements in said first pocketed tray;

means for positioning a second pocketed tray of said pocketed trays in a second scan bed, while scanning is being performed on said first pocketed tray;

means for immediately beginning scanning elements in said second pocketed tray after completion of scanning elements in said first pocketed tray;

means for transporting said first pocketed tray to an off-load position while scanning of said second pocketed tray is being performed;

means for positioning a third pocketed tray in said first scan bed before completion of scanning of elements in said second pocketed tray, whereby scanning of said elements in said third pocketed tray is enabled to begin immediately upon completion of scanning of elements in said second pocketed tray; and means for transporting said second pocketed tray to said off-load position while scanning of said third pocketed tray is being performed, such that continuous scanning without transport delay is enabled.

* * * * *